United States Patent [19]

Stella et al.

[11] Patent Number: 4,645,322

[45] Date of Patent: Feb. 24, 1987

[54] FILM COUNTER

[75] Inventors: Joseph A. Stella; Alfred E. Corrigan, both of Peabody, Mass.

[73] Assignee: Polaroid Corporation, Cambridge, Mass.

[21] Appl. No.: 857,949

[22] Filed: May 1, 1986

[51] Int. Cl.⁴ .................. G03B 17/36; G03B 17/50
[52] U.S. Cl. .................................. 354/180; 354/217; 354/277; 354/289.1
[58] Field of Search .............. 354/83, 84, 88, 174, 354/180, 217, 277, 289.1, 283

[56] References Cited

U.S. PATENT DOCUMENTS

| | | | |
|---|---|---|---|
| 308,781 | 12/1884 | Menns | 354/180 |
| 1,195,187 | 8/1916 | Cuthbert | 354/217 |
| 2,483,578 | 10/1949 | Gallistel | 354/180 |
| 3,653,313 | 4/1972 | Leduc | 354/289.1 |
| 3,984,852 | 10/1976 | Johnson et al. | 354/217 |
| 4,212,524 | 7/1980 | Douglas | 354/86 |
| 4,568,163 | 2/1986 | Czumak et al. | 354/88 |

Primary Examiner—A. A. Mathews
Attorney, Agent, or Firm—Alfred E. Corrigan

[57] ABSTRACT

Apparatus having a first chamber, for receiving a film cassette containing a plurality of film units of the instant type, and a second chamber, into which the film units are adapted to be sequentially advanced subsequent to their photographic exposure. The second chamber includes a film counter mounted in lighttight relation therewith for indicating the number of exposed film units contained within the second chamber.

9 Claims, 14 Drawing Figures

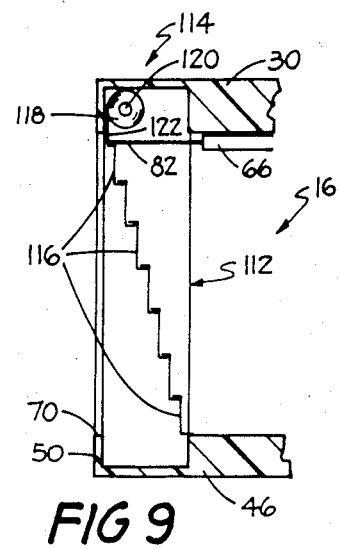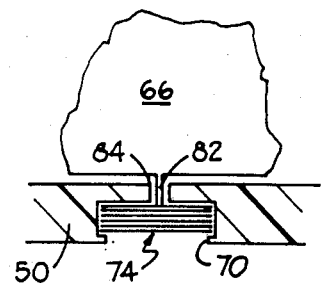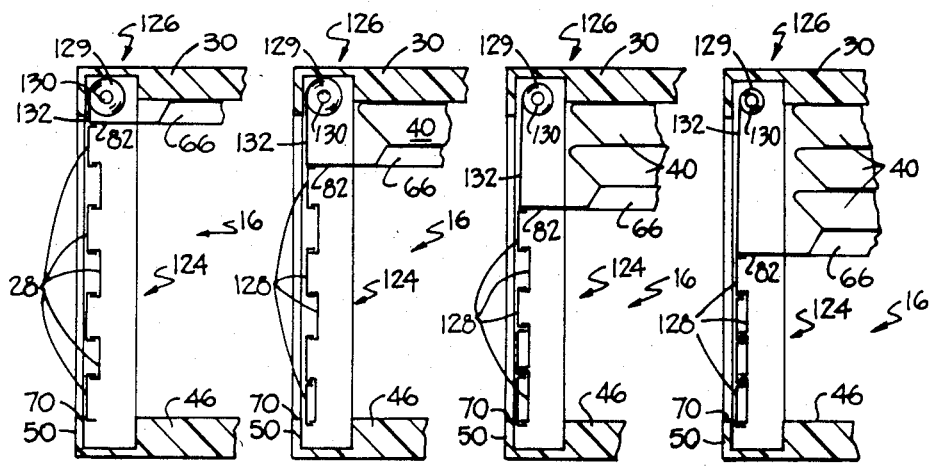

FILM COUNTER

BACKGROUND OF THE INVENTION

1. Field of the Invention

The invention relates to apparatus having means for indicating the number of photographically exposed instant type film units contained within a storage chamber.

2. Description of the Prior Art

The invention relates to apparatus having a chamber for receiving and storing photographically exposed film units until such time that they are to be removed therefrom for processing of their latent images, and more particularly to such an apparatus having a means for indicating the number of exposed film units contained within the chamber.

Lately there has been proposed a system which includes (1) a camera back having a film chamber, for receiving a film cassette containing a stack of premounted transparency film frames of the instant or self-developing type, and a storage chamber, for receiving the film frames subsequent to their exposure, and (2) a processor into which the camera back may be placed for the processing of the individual film frames. This system is described in U.S. Pat. No. 4,568,163, granted to Frank M. Czumak et al. on Feb. 4, 1986. However, there does not appear to be any way in which the user can positively tell how many, if any, photographically exposed film frames are contained within the storage chamber. Thus, valuable time may be lost if the user were to detach the camera back from a camera and insert it into the processor if there were no film frames contained within the storage chamber.

Film counters per se are well known as evidenced by U.S. Pat. Nos. 1,195,187, 3,653,313, and 4,212,524. The '187 patent discloses a camera back having a slot therein and the film is provided with a backing sheet having indicia thereon which is viewable through the slot. The '313 and '524 patents disclose cameras having film counters which are automatically reset to their starting positions upon the removal of a film cassette from the camera's film chamber. As such, the counters do not necessarily give a true reading of the number of film units contained within the cassette. For example, if the starting position of the counter were "10" and two exposures were made thereby indexing the counter into the "8" position, an incorrect reading would occur if the user were to now remove the cassette from the camera and reinsert it, thereby resetting the counter to the "10" position.

SUMMARY OF THE INVENTION

The present invention relates to apparatus for supporting individual film units of the instant type in position for exposure and then transferring them to a light-tight chamber for storage until such time that it is desired to process one or more of the exposed film units, and more particularly to such an apparatus having a unique counter for positively indicating the number of exposed film units contained within the storage chamber. The apparatus includes a housing having a first chamber for receiving a cube shaped film cassette containing a stack of premounted film units, preferably of the instant transparency type, and a second chamber for receiving and storing the individual film units, subsequent to their photographic exposure, until such time that they are to be removed therefrom for processing.

The apparatus also includes means comprising a coiled flat spring for advancing a film unit, subsequent to its exposure, from the film cassette located in the first chamber to the second chamber wherein it is supported by a spring biased plate or platen. One exterior wall of the second chamber is provided with a light sealed opening through which the exposed film units being supported on the platen may be moved to the exterior of apparatus for processing. An adjacent wall of the second chamber is formed with an opening in which light sealing structure is movably mounted in concert with movement of the platen as the number of film units being supported thereby increases or decreases. Suitable indicia is imprinted upon the light sealing structure for providing the user of the apparatus with a true reading of the number of film units located within the second chamber.

An object of the invention is to provide an apparatus for supporting a stack of film units in position for their sequential exposure with a storage chamber having a counter for correctly indicating the number of exposed and non-processed film units contained therein.

Another object of the invention is to provide an apparatus of the type described with a collapsible film counter.

Still another object of the invention is to provide an apparatus of the type described with a film counter which includes a first section, which progressively moves out out lighttight relation with an opening in a wall of the storage chamber, and a second section, which simultaneously moves into lighttight relation with the opening.

Other objects of the invention will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE INVENTION

For a fuller understanding of the nature and objects of the invention, reference should be had to the following detailed description taken in connection with the accompanying drawings wherein:

FIG. 2A is a top elevational cross sectional view of a portion of the apparatus showing the relationship between a platen and a film counter assembly;

FIG. 9 is a cross-sectional view of still another embodiment of a film counter; and FIGS. 10-13 are cross-sectional views of still another embodiment of a film counter showing the relationship between various elements thereof as the number of film units contained within a storage chamber of the apparatus increases.

DETAILED DESCRIPTION OF THE INVENTION

Figure 1:
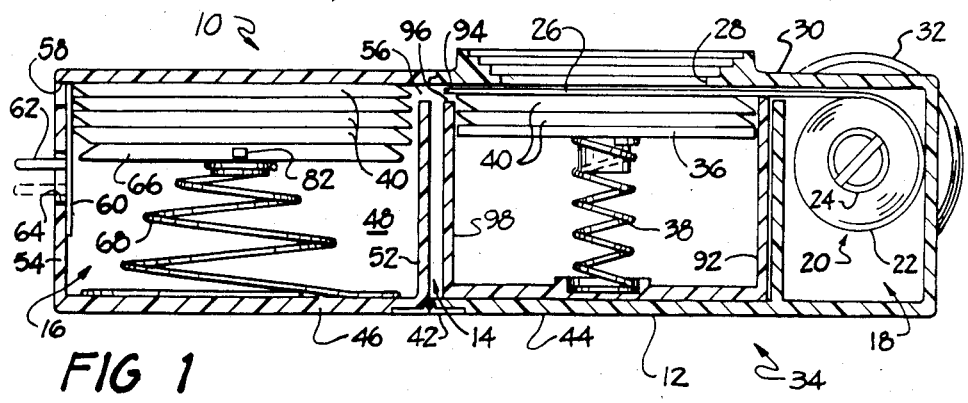
FIG. 1 is a side elevational view, in cross section, of an apparatus supporting a film cassette containing a plurality of premounted film units.
Figure 2:
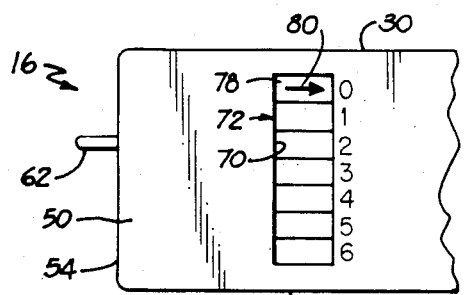
FIG. 2 is a partial side elevational view of the left end of the apparatus shown in FIG. 1 showing a preferred embodiment of a film counter.

Reference is now made to the drawings, and in particular to FIGS. 1-6 wherein is shown an apparatus 10 which incorporates a preferred embodiment of the invention. The apparatus 10 includes a housing 12 having a generally parallelepipedic configuration which includes a first chamber 14 having a second chamber 16 on its left (as viewed in FIG. 1) and a third chamber 18 on its right. Mounted within the third chamber 18 is a film advancing means 20 in the form of a coiled resilient sheet of material 22 having one end secured to a shaft 24 and its opposite free end 26 protruding into the first chamber 14 wherein, in the position shown in FIG. 1, it functions to prevent the entry of light into the first chamber 14 via an exposure opening 28 formed in a forward wall 30 of the apparatus 10. The sheet material 22 is adapted to be partially coiled upon and partially uncoiled from the shaft 24 via the rotation of an exteriorly mounted wheel 32 which is coupled to the shaft 24.

The first chamber 14 is adapted to receive a film cassette 34 containing a platen 36, a spring 38 for resiliently biasing the platen 36 toward a forward wall (not shown) of the cassette 34, a stack of premounted film units 40, preferably of the 35 mm instant transparency type, and a dark slide (not shown) for preventing entry of light into the cassette 34 prior to its loading into the first chamber 14. Access to the first chamber 14 is had by manually rotating the second chamber 16 in a counter clockwise direction about a hinge 42 which interconnects the bottom or rear walls 44 and 46 of the first and second chambers 14 and 16, respectively.

The second chamber 16, includes a pair of side walls 48 and 50, and a pair of end walls 52 and 54 which extend forwardly from the rear wall 46 and terminate just short of the forward wall 30 of the apparatus 10 so as to define an ingress 56 via which the film units 40 may move into the second chamber 16 and an egress 58 through which the film units 40 may exit from the second chamber 16 for processing. The egress 58 is normally rendered lighttight by a light seal 60 having an extention 62 which protrudes to the exterior of the second chamber 16 via an elongate slot 64 in the end wall 54. The extension 62 is adapted to be engaged and moved to the broken line position shown in FIG. 1 by a member of a film processor so as to enable any exposed film units 40 contained in the second chamber 16 to be removed therefrom for processing. A platen 66 is positioned within the chamber 16 for supporting the exposed film units 40. The platen 66 is biased toward the forward wall 30 by a spring 68 and may be stopped short thereof by any suitable means. Also, it will be noted that the adjacent edges of the film units 40 and the platen are tapered so as to facilitate the stacking of the film units 40 upon the platen 66.

Figures 3, 4, 5, 6:
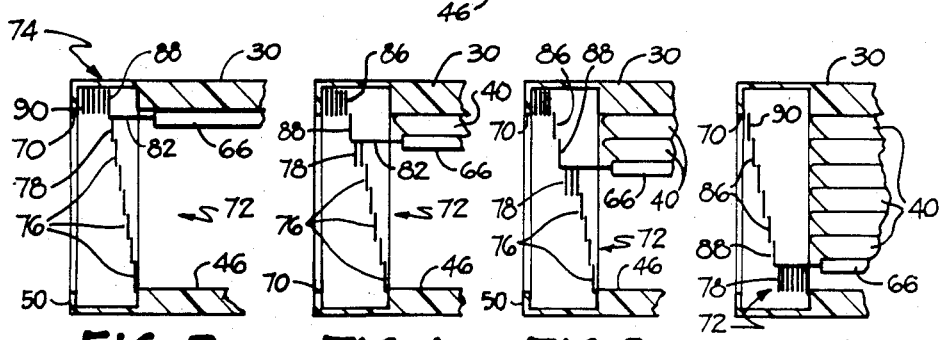
FIGS. 3–6 are schematic cross sectional views of the film counter shown in FIG. 2 which depict the relationship between various elements of the film counter as the number of film units in the apparatus' storage chamber progressively increases.

The sidewall 50 is provided with an elongate opening 70 which communicates with the interior of the second chamber 16. A light sealing structure in the form of a film counter is mounted adjacent the opening 70 for preventing the passage of ambient light into the second chamber 16. Specifically, the light sealing structure includes first and second light sealing means 72 and 74, respectively. The light sealing means 72 comprises a plurality of horizontally disposed opaque slats 76 and a top opaque slat 78 which slightly overlap each other when they are in a completely expanded position, as shown in FIG. 3, so as to completely light seal the opening 70. The lowermost slat 76 is secured to the bottom wall 46 and the slats 76 and 78 are resiliently coupled to each other by any suitable means such that they assume the expanded condition shown in FIG. 3 and must be urged into the collapsed condition shown in FIG. 6. The uppermost slat 78 carries suitable indicia, such as an arrow 80, which is adapted to be located in alignment with one of a series of numerals located on the exterior surface of the side wall 50 for indicating the actual number of film units 40 being supported by the platen 66. Also, the slat 78 is fixedly secured to the platen 66 by a rod 82 which extends through a narrow slot 84 in the wall 50.

The second light sealing means 74 comprises a plurality of horizontally disposed opaque slats or louvers 86 including a slat 88 which is fixedly secured to the rod 82 and a slat 90 which is fixedly secured to the wall 30. The second light sealing means 74 is generally identical to the first light sealing means 72 except that its slats are resiliently coupled to each other for movement from a normally collapsed condition, as shown in FIG. 3, to an expanded or extended condition, as shown in FIG. 6.

As previously described, the film cassette 34 is adapted to be inserted into the first chamber 14, trailing end wall 92 first. During such insertion, an edge 94 of the free end 26 of the film advancing means 20 is located in a first position in alignment with an ingress slot (not shown) in the trailing end wall 92 and thus in alignment with the aformentioned dark slide (not shown) in the film cassette 34. The relative movement between the film cassette 34 and the edge 94 results in the latter entering the film cassette 34 and engaging a trailing end of the dark slide. Continued insertion movement of the film cassette 34 results in a corresponding opposite movement of the dark slide from the film cassette 34 via an egress slot 96 in a leading end wall 98 of the film cassette 34, thus progressively uncovering the uppermost premounted film unit 40. However, as the uppermost film unit 40 is being uncovered by the movement of the dark slide, it is being simultaneously covered in lighttight relation by the free end 26 of the film advancing means 20.

After the film cassette 34 has been fully inserted into the first chamber 14, the second chamber is rotated into the position shown in FIG. 1 wherein it is suitably latched by means not shown. The apparatus 10 may now be attached to the main body of a camera and the knob 32 rotated in a direction as to move the edge 94 of the film advancing means 20 to a second position wherein the edge 94 is in alignment with the aforementioned ingress slot in the film cassette 34 and the end 26 is out of covering relation to the uppermost premounted transparency film frame 40 in the stack. Thus removed, the spring 38 and platen 36 resiliently urge the stack upwardly until the uppermost premounted transparency film frame 40 is located in engagement with the cassette's top wall and thus in position for exposure to the camera's lens. After the film unit has been exposed, the knob 32 is rotated in a direction so as to cause the edge 94 of the film advancing means 20 to move from its second position to its first position. During such movement, the edge 94 engages the trailing end of the exposed premounted transparency film frame and moves it from the film cassette 34 via the egress 96 and into the second chamber 16 via the slot 56 where it is supported by the spring biased platen 66. To expose the next film unit the procedure is repeated, i.e., the edge 94 is returned to its second position, the film unit exposed, and the edge 94 returned to its first position thus depositing the second premounted transparency film unit 40 in the second chamber 16 on top of the first premounted transparency film unit. During the passage of the second premounted film unit 34 into the second chamber 16, its tapered end cooperates with a tapered trailing edge of the first premounted transparency film unit so as to cause the former to move to position on top of the latter. For a more detailed description of the film cassette 34 and the film units 40 reference should be had to the aforementioned U.S. Pat. No. 4,568,163.

As the first exposed film unit 40 enters the second chamber 16, its tapered leading end cooperates with the oppositely tapered trailing end of the platen 66 to force the latter in a first direction downwardly against the bias of the spring 68. FIG. 3 depicts an empty chamber 16 and FIG. 4 depicts the chamber 16 with the platen 66 supporting a single film unit 40. It can be readily seen from a viewing of FIGS. 3 and 4 that as the first film unit 40 forces the platen 66 downwardly, the rod 82 (attached to the slats 78 and 86) causes the first light sealing means 72 to move toward a collapsed condition, which would ordinarily allow the passage of light into the second chamber 16 via the opening 70 but for the fact that the slat 86 is simultaneously moved into light sealing relation with the same opening 70. As the second exposed film unit 40 enters the chamber 16 it rides up and over the preceeding exposed film unit 40 while simultaneously moving the platen 66 further in the first direction. This latter downward movement of the platen 66 causes the rod 82 to engage the upper surface of the uppermost slat 76 and move it and the slat 78 downwardly into alignment with the next uppermost slat 76, as depicted in FIG. 5. At the same time, movement of the slat 88 of the second light sealing means 74 results in the downward movement of the rearwardmost slat 86 due to the interconnection between the slats of the second light sealing means 74, thus effectively maintaining the light sealing of the opening 70 as the second light sealing means progressively moves toward an extended or expanded condition. The above described series of events may continue to occur until the second chamber 16 holds six exposed film units 40, as depicted in FIG. 6. It will be noted that as the slat 78 progressively moves downward it assumes one of a series of positions wherein the arrow 80 is located in alignment with one of the numerals located on the wall 50 adjacent to the opening 70. Thus, an accurate reading of the number of film units 40 being supported by the platen 66 is readily available to the user.

After one or more, but less than all, of the premounted transparency film units 40 have been exposed, the photographer may wish to process one or more of the exposed ones before exposing the remaining film frames. In such a case, the camera back 10 is detached from the main body of the camera while the edge 94 of the film advancing means 20 is in the first position in lighttight relation to the next film unit to be exposed. The camera back 10 is then placed in a film processor. During such insertion, the extension 62 of the light seal 60 engages an inclined surface of a camming member mounted within the processor thereby moving the extension 62 and associated light shield 60 downwardly thus opening the slot 58 in the second chamber 16. The exposed film units 40 may then be removed from the second chamber 16 by actuating the film advancing means in a manner which causes its edge 94 to move from its first position to a third position adjacent the slot 58, thus advancing the uppermost film unit 40 from the second chamber 16 while the platen 66 moves in a second direction under the bias of the spring 68.

When one or more of the exposed film units 40 is removed from the second chamber 16 for processing, the aforementioned resilient interconnection between the slats of the first light sealing means 72 urges them into an expanded condition while the slats of the second light sealing means 74 are simultaneously urged into a collapsed condition wherein they are located in alignment with each other.

Figure 7:
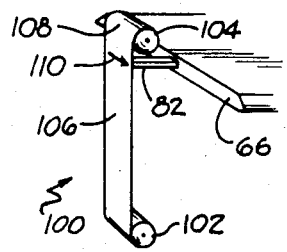
FIG. 7 is a perspective view of an alternative embodiment of a film counter which may be incorporated into the apparatus of FIG. 1.
Figure 8:
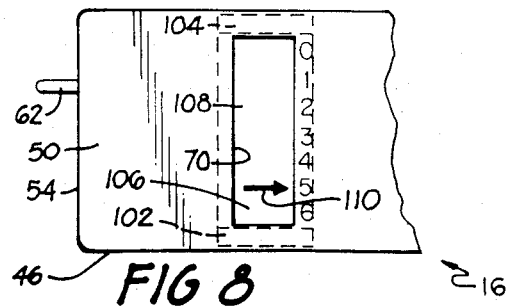
FIG. 8 is a side elevational view similar to FIG. 2, with the film counter of FIG. 7 incorporated into the apparatus.

Reference is now made to FIGS. 7 and 8 wherein is shown an alternative embodiment of the invention. In this embodiment the slats of the first and second light sealing means 72 and 74 are replaced by a single sheet of opaque material 100, the opposite ends of which are fixedly attached to a pair of spring wound rollers 102 and 104 mounted at each end of the opening 70 in the side wall 50. In other words, the sheet material 100 includes adjacent portions 106 and 108 which function as the first and second light sealing means, respectively, for rendering the opening 70 lighttight. As shown in FIG. 7, the portion 106, which is attached to the platen 66 via the rod 82, is adapted to be wound upon the counterclockwise biased roller 102 as the platen 66 moves downwardly while the portion 108 is adapted to be simultaneously unwound from the clockwise biased roller 104. The portion 106 includes suitable indicia 110 thereon which is adapted to be located in alignment with one of the numerals on the wall 50 for indicating the number of film units being supported by the platen 66. The resilient bias on the rollers 102 and 104 is sufficient to prevent any slack from forming in the sheet of material 100 during its movement without adversely affecting the performance of the platen's spring 68.

Still another embodiment of the invention is shown in FIG. 9. In this embodiment first and second light sealing means 112 and 114, respectively, are provided for preventing the entry of ambient light into the second chamber 16 via the opening 70. The first light sealing means 112 comprises a plurality (7) of Z-shaped opaque slats or louvers 116 which are interconnected in head-to-toe relation with the lowermost slat 116 being fixedly secured to the bottom wall 46 of the second chamber 16 and the uppermost slat 116 being fixedly secured to the rod 82 extending from the platen 66. The second light sealing means 114 includes a sheet of flexible opaque material 118 which is wound upon a roller 120. The sheet material 118, as well as the slats 116, has a width greater than that of the opening 70. One end of the sheet material 118 is fixedly secured to the roller 120 and its opposite end 122 is fixedly secured to the upper end of the uppermost slat 116, as viewed in FIG. 9. The roller 120 is resiliently biased in a clockwise direction about its longitudinal axis so as to prevent the formation of any slack in the material 118 as it moves between its expanded and collapsed (wound upon the roller 120) condition.

In the embodiment shown in FIG. 9, movement of a film unit 40 into a position on top of the platen 66 results in the top six slats 116 moving downwardly, simultaneously, until the second lowermost slat 116 is located in front of the ultimate or lowermost slat 116. Downward movement of the slats 116 toward a collapsed condition is accompanied by the simultaneous unwinding of the sheet material 118 from the roller 120, thus resulting in the counterclockwise rotation of the latter. Such rotation of the roller 120 is effective to increase the spring bias on the roller 120. Thus, when the platen 66 moves upwardly under the influence of the spring 68 as the exposed film units are removed from the second chamber 16, the bias on the roller 120 causes the second light sealing means 114 to move from an expanded condition to a collapsed or coiled condition upon the roller 120 while simultaneously providing a force for assisting the spring biased platen 66 in pulling the slats 116 upwardly toward their expanded condition. As in the previous embodiments, suitable indicia is provided on the uppermost slat 116 for indicating the number of film units being supported by the platen 66.

Still another embodiment of the invention is shown in FIGS. 10-13. In this embodiment, the opening 70 in the side wall 50 is light sealed by first and second light sealing means 124 and 126, respectively. The first light sealing means 124 comprises a plurality (7) of U-shaped opaque slats 128 including a lowermost one which is fixedly attached to the side wall 50 of the second chamber 16 and an uppermost slat which is fixedly attached to the rod 82. The second light sealing means 126 comprises an opaque sheet of flexible material 129 having one end secured to a spring biased roller 130, an intermediate portion wound about the roller 130, and its opposite end 132 secured to the rod 82.

Movement of an exposed film unit 40 into the second chamber 16 forces the platen 66 downwardly thus resulting in the simultaneous movement of the six uppermost slats 128 downwardly until the second slat 128 from the bottom is located behind and in substantial alignment with the lowermost or fixed slat 128, as shown in FIG. 11. Movement of the slats 128 downwardly toward a collapsed condition is accompanied by a corresponding unwinding of the second light sealing means 126. Entry of a second exposed film unit 40 into the second chamber 16 again causes an incremental downward movement of the five uppermost slats 128 until the fourth uppermost slat 128 is located in substantial alignment with and behind the fifth uppermost slat 128, as is shown in FIG. 12. While this type of stacking arrangement limits the number of exposed film units 40 which may be contained within the second chamber 16 at one time, it does provide for their stacking within a narrower space (two slats deep) vis-a-vis the embodiment of FIGS. 1-6 where the slats 76 are stacked seven deep when the first light sealing means 72 is in a fully collapsed condition.

Since certain changes may be made in the above described apparatus without departing from the scope of the invention herein involved, it is intended that all matter contained in the above description or shown in the accompanying drawings shall be interpreted as illustrative and not in a limiting sense.

What is claimed is:

1. Apparatus for supporting a film cassette in position for the sequential exposure of a plurality of instant type film units contained therein, said apparatus comprising:

means for defining a housing having a first chamber, for receiving a film cassette containing a plurality of instant type film units, and a second chamber, for storing the film units subsequent to their exposure and prior to the processing of the same;

means for advancing a film unit, subsequent to its photographic exposure, from said first chamber to said second chamber;

supporting means located within said second chamber for supporting the exposed film units in a stack, said supporting means being adapted for movement in a first direction as the number of exposed film units supported thereby increases, and in a second direction as the number of exposed film units supported thereby decreases;

means for defining an opening in an exterior wall of said second chamber;

first means for light sealing said opening, said first light sealing means being coupled to said support means for progressive movement out of light sealing relation with said opening as said support means progressively moves in said first direction, and into light sealing relation with said opening as said support means moves in said second direction;

second light sealing means coupled to said first light sealing means for progressively moving into and out of light sealing relation with said opening as said first light sealing means progressively moves out of and into light sealing relation with said opening; and indicia means carried by one of said first or second light sealing means for indicating the number of exposed film units located on said supporting means.

2. Apparatus as defined in claim 1 wherein said first light seals means comprises a plurality of louvers mounted for movement from an expanded condition toward a collapsed condition as said support means moves in said first direction.

3. Apparatus as defined in claim 1 wherein said second light sealing means comprises a plurality of louvers mounted for movement from a collapsed condition toward an extended condition as said support means moves in said first direction.

4. Apparatus as defined in claim 3 wherein said first light sealing means comprises a plurality of louvers mounted for movement from an expanded condition toward a collapsed condition as said support means moves in said first direction.

5. Apparatus as defined in claim 2 wherein said louvers of said first light sealing means have a generally Z-shaped cross-sectional configuration.

6. Apparatus as defined in claim 2 wherein said second light sealing means comprises a coiled sheet of material which is adapted to be uncoiled so as to progressively light seal said opening as said louvers move toward said collapsed condition.

7. Apparatus as defined in claim 2 wherein said louvers have generally U-shaped cross-sectional configuration.

8. Apparatus as defined in claim 1 wherein said first and second light sealing means comprises adjacent portions of a single sheet of material.

9. Apparatus as defined in claim 8 further including a spring wound roller mounted at opposite ends of said opening onto which opposite ends of said single sheet of material may be simultanteously coiled and uncoiled as said support means moves in said first and second directions.

* * * * *